United States Patent
Gupta

(10) Patent No.: US 10,808,047 B2
(45) Date of Patent: Oct. 20, 2020

(54) SILVER AND COPPER ITACONATES AND POLY ITACONATES

(71) Applicant: G&P Holding, Inc., Lowell, MA (US)

(72) Inventor: Akshat Gupta, Lowell, MA (US)

(73) Assignee: G&P Holding, Inc., Lowell, MA (US)

(*) Notice: Subject to any disclaimer, the term of this patent is extended or adjusted under 35 U.S.C. 154(b) by 0 days.

(21) Appl. No.: 15/752,713

(22) PCT Filed: Aug. 17, 2016

(86) PCT No.: PCT/US2016/047277
§ 371 (c)(1),
(2) Date: Feb. 14, 2018

(87) PCT Pub. No.: WO2017/034871
PCT Pub. Date: Mar. 2, 2017

(65) Prior Publication Data
US 2018/0251578 A1    Sep. 6, 2018

Related U.S. Application Data

(60) Provisional application No. 62/208,009, filed on Aug. 21, 2015.

(51) Int. Cl.
| | |
|---|---|
| C08F 22/02 | (2006.01) |
| C08F 2/28 | (2006.01) |
| C08F 120/02 | (2006.01) |
| C09D 7/65 | (2018.01) |
| C08F 2/22 | (2006.01) |

(Continued)

(52) U.S. Cl.
CPC ............ *C08F 2/28* (2013.01); *C08F 2/22* (2013.01); *C08F 22/02* (2013.01); *C08F 120/02* (2013.01); *C08F 122/02* (2013.01); *C08K 3/08* (2013.01); *C09D 5/14* (2013.01); *C09D 5/16* (2013.01); *C09D 7/65* (2018.01); *C08K 2003/085* (2013.01); *C08K 2003/0806* (2013.01)

(58) Field of Classification Search
CPC ..................................................... C08F 22/02
See application file for complete search history.

(56) References Cited

U.S. PATENT DOCUMENTS

| | | | |
|---|---|---|---|
| 2,294,226 A | 8/1942 | D'Alello | |
| 3,055,873 A | 9/1962 | Hull et al. | |

(Continued)

FOREIGN PATENT DOCUMENTS

| | | |
|---|---|---|
| CN | 101293823 B | 10/2011 |
| EP | 1 281 787 A2 | 2/2003 |

(Continued)

OTHER PUBLICATIONS

Lehtonen, P.O. Finnish Chemical Letters, 1986, 13(5), 141-149. (Year: 1986).*

(Continued)

*Primary Examiner* — Rip A Lee
(74) *Attorney, Agent, or Firm* — Nutter McClennen & Fish LLP

(57) ABSTRACT

An itaconate molecule can have the formula: wherein R1 and R2 are each independently selected from H, Ag, or Cu; wherein the ratio of Ag and/or Cu to itaconate is at least about 1:1; and wherein n ranges from 1 to 14. The itaconates are useful, for example, as antimicrobial agents.

16 Claims, 6 Drawing Sheets

Poly (silver Itaconate)

Poly (Disilver Itaconate)

(51) Int. Cl.
  *C09D 5/14* (2006.01)
  *C08F 122/02* (2006.01)
  *C08K 3/08* (2006.01)
  *C09D 5/16* (2006.01)

(56) References Cited

U.S. PATENT DOCUMENTS

| | | |
|---|---|---|
| 3,560,529 A | 2/1971 | Blumbergs et al. |
| 3,702,298 A | 11/1972 | Zsoldos, Jr. et al. |
| 3,984,341 A | 10/1976 | Haschke et al. |
| 4,016,124 A | 4/1977 | Crisp et al. |
| 4,072,784 A | 2/1978 | Cirino et al. |
| 4,666,616 A | 5/1987 | Rossmoore |
| 4,882,277 A | 11/1989 | Czytko et al. |
| 4,915,955 A | 4/1990 | Gomori |
| 4,917,836 A | 4/1990 | Yamane et al. |
| 5,008,106 A | 4/1991 | Merianos et al. |
| 5,073,382 A | 12/1991 | Antelman |
| 5,078,902 A | 1/1992 | Antelman |
| 5,182,169 A | 1/1993 | Fukuda et al. |
| 5,223,590 A | 6/1993 | Hughes et al. |
| 5,223,592 A | 6/1993 | Hughes et al. |
| 5,225,392 A | 7/1993 | Chang et al. |
| 5,326,966 A | 7/1994 | Fukuda et al. |
| 5,332,559 A | 7/1994 | Brierley et al. |
| 5,336,744 A | 8/1994 | Swift et al. |
| 5,437,858 A | 8/1995 | Hungerbach et al. |
| 5,464,559 A | 11/1995 | Marchin et al. |
| 5,656,646 A | 8/1997 | Pemer et al. |
| 5,731,361 A | 3/1998 | Horn et al. |
| 5,744,292 A | 4/1998 | Yoneyama |
| 5,834,294 A | 11/1998 | Brierley et al. |
| 5,889,088 A | 3/1999 | Kisuno et al. |
| 5,916,487 A | 6/1999 | Weidlich et al. |
| 5,945,032 A | 8/1999 | Breitenbach et al. |
| 6,130,304 A | 10/2000 | Sumiya et al. |
| 6,162,391 A | 12/2000 | Kowata et al. |
| 6,197,814 B1 | 3/2001 | Arata |
| 6,280,748 B1 | 8/2001 | Morita et al. |
| 6,303,711 B1 | 10/2001 | Sumiya et al. |
| 6,306,460 B1 | 10/2001 | Reck et al. |
| 6,503,691 B1 | 1/2003 | Goodin et al. |
| 6,838,095 B2 | 1/2005 | Newman et al. |
| 6,893,810 B1 | 5/2005 | Sakai et al. |
| 7,491,777 B2 | 2/2009 | Jakob et al. |
| 7,732,486 B2 | 6/2010 | Arata |
| 7,951,404 B2 | 5/2011 | Gomori |
| 8,399,003 B2 | 3/2013 | Krall et al. |
| 9,757,387 B2 * | 9/2017 | Karandikar ............ A61L 15/20 |
| 2002/0007005 A1 | 1/2002 | Reck et al. |
| 2002/0009596 A1 | 1/2002 | Mizutani |
| 2003/0060537 A1 | 3/2003 | Palazzo |
| 2003/0064328 A1 * | 4/2003 | Friedel ............... G03C 1/49809 430/350 |
| 2003/0065058 A1 | 4/2003 | Piedrahita et al. |
| 2003/0065090 A1 | 4/2003 | Kelly et al. |
| 2003/0078338 A1 | 4/2003 | Schlarb et al. |
| 2003/0132166 A1 | 7/2003 | Rey |
| 2003/0162129 A1 | 8/2003 | Goodin et al. |
| 2003/0164105 A1 | 9/2003 | Tashiro |
| 2003/0230967 A1 | 12/2003 | Kawamura et al. |
| 2004/0001947 A1 | 1/2004 | Kawamura et al. |
| 2004/0067434 A1 | 4/2004 | Kano et al. |
| 2004/0081911 A1 | 4/2004 | Noglik et al. |
| 2004/0096421 A1 | 5/2004 | Kurihara et al. |
| 2004/0156912 A1 | 8/2004 | Kawamura et al. |
| 2004/0168820 A1 | 9/2004 | Kanamori et al. |
| 2004/0185238 A1 | 9/2004 | Kawamura et al. |
| 2005/0106348 A1 | 5/2005 | Koike et al. |
| 2006/0052503 A1 | 3/2006 | Shimizu et al. |
| 2006/0153903 A1 | 7/2006 | Leno et al. |
| 2006/0198802 A1 | 9/2006 | Ito et al. |
| 2007/0232489 A1 | 10/2007 | Tatewaki et al. |
| 2008/0003424 A1 | 1/2008 | Kawamura |
| 2008/0004175 A1 | 1/2008 | Aoshima et al. |
| 2008/0027180 A1 | 1/2008 | Higashimoto et al. |
| 2008/0071024 A1 | 3/2008 | Morishita et al. |
| 2008/0113892 A1 | 5/2008 | Barnhart et al. |
| 2008/0193405 A1 | 8/2008 | Mukherjee et al. |
| 2008/0194434 A1 | 8/2008 | Huff et al. |
| 2009/0114108 A1 | 5/2009 | Oya et al. |
| 2010/0009010 A1 | 1/2010 | Gomori |
| 2010/0189599 A1 | 7/2010 | Bobbert |
| 2010/0247911 A1 | 9/2010 | Aso et al. |
| 2010/0255321 A1 | 10/2010 | Jahns et al. |
| 2011/0042302 A1 | 2/2011 | Shooshtari et al. |
| 2011/0091733 A1 | 4/2011 | Feuerhake et al. |
| 2011/0171151 A1 | 7/2011 | Arnaud et al. |
| 2011/0224393 A1 | 9/2011 | Durant et al. |
| 2011/0244256 A1 | 10/2011 | Song et al. |
| 2012/0010338 A1 | 1/2012 | Terrenoire et al. |
| 2012/0098160 A1 | 4/2012 | Watanabe et al. |
| 2012/0196972 A1 | 8/2012 | Balk et al. |
| 2012/0208958 A1 | 8/2012 | Jahns et al. |
| 2013/0101494 A1 | 4/2013 | Ural et al. |
| 2013/0118531 A1 | 5/2013 | Dobrawa et al. |
| 2013/0123160 A1 | 5/2013 | Dobrawa et al. |
| 2013/0123372 A1 | 5/2013 | Dobrawa et al. |
| 2013/0133548 A1 | 5/2013 | Shooshtari et al. |
| 2013/0197123 A1 | 8/2013 | Kaneko |
| 2013/0338227 A1 | 12/2013 | Saint Victor et al. |
| 2013/0338281 A1 | 12/2013 | Aso |
| 2014/0107273 A1 | 4/2014 | Ochiai et al. |
| 2014/0127274 A1 | 5/2014 | Arnaud et al. |
| 2014/0134094 A1 | 5/2014 | Aso et al. |
| 2014/0147410 A1 | 5/2014 | Ghosh et al. |
| 2014/0213692 A1 | 7/2014 | Zhang et al. |
| 2014/0296352 A1 | 10/2014 | Arnaud |

FOREIGN PATENT DOCUMENTS

| | | | |
|---|---|---|---|
| EP | 1 108 534 B1 | 8/2005 | |
| EP | 2 230 312 A1 | 9/2010 | |
| EP | 2 493 574 B1 | 6/2014 | |
| FR | 2966219 A1 | 6/2012 | |
| JP | 2005331725 A | * 12/2005 | ............ G03C 1/498 |
| JP | 2008-238020 A | 10/2008 | |
| JP | 2008-239764 A | 10/2008 | |
| WO | 96/01231 A1 | 1/1996 | |
| WO | 01/51009 A1 | 7/2001 | |
| WO | 01/77238 A1 | 10/2001 | |
| WO | 2008/117778 A1 | 10/2008 | |
| WO | 2008/117780 A1 | 10/2008 | |
| WO | 2009/015286 A2 | 1/2009 | |
| WO | 2009/044146 A1 | 4/2009 | |
| WO | 2009/076491 A2 | 6/2009 | |
| WO | 2010/026534 A1 | 3/2010 | |
| WO | 2010/105851 A1 | 9/2010 | |
| WO | 2011/051323 A2 | 5/2011 | |
| WO | 2011/051374 A1 | 5/2011 | |
| WO | 2011/089085 A1 | 7/2011 | |
| WO | 2012/073080 A1 | 6/2012 | |
| WO | 2012/076426 A1 | 6/2012 | |
| WO | 2012/109130 A1 | 8/2012 | |
| WO | 2012/144233 A1 | 10/2012 | |
| WO | 2013001172 A1 | 1/2013 | |
| WO | 2013/068272 A1 | 5/2013 | |
| WO | 2013/068384 A2 | 5/2013 | |
| WO | 2013/068479 A1 | 5/2013 | |
| WO | 2013/083247 A1 | 6/2013 | |
| WO | 2013/188508 A1 | 12/2013 | |
| WO | 2014/057993 A1 | 4/2014 | |
| WO | 2014/083175 A1 | 6/2014 | |
| WO | 2014/143773 A1 | 9/2014 | |
| WO | 2014/179353 A1 | 11/2014 | |
| WO | 2015/096055 A1 | 7/2015 | |
| WO | 2015100412 A1 | 7/2015 | |

OTHER PUBLICATIONS

Tomić, S.Lj.; Filipović, J.M.; Vrhovac, Lj.P.; Plavšić, M.B. Physical Chemistry 2000, Proceedings of the International Conference on Fundamental and Applied Aspects of Physical Chemistry, 5th,

(56) References Cited

OTHER PUBLICATIONS

Belgrade, Yugoslavia; Sep. 27-29, 2000 (2000), 498-500. ( Year: 2000).*
Bal, A et al., "Synthesis and Characterization of Copolymeric and Terpolymeric Hydrogel-Silver Nanocomposites Based on Acrylic Acid, Acrylamide and Itaconic Acid: Investigation of Their Antibacterial Activity Against Gram-Negative Bacteria," Brazilian Journal of Chemical Engineering, vol. 32, No. 2, pp. 509-518, Apr.-Jun. 2015; abstract; p. 510, col. 2, paragraphs 3, 5; p. 511, col. 1, paragraphs 1-3, p. 511, col. 2, Table 2 (10 pages).
Gupta, P et al., "Investigation of Antibacterial Properties of Silver Nanoparticle-loaded Poly (acrylamide-co-itaconic acid)- Grafted Cotton Fabric," The Journal of Cotton Science, vol. 12, pp. 280-286, 2008; abstract; p. 282, col. 1, paragraphs 3-6; col. 2, paragraphs 1-4 (7 pages).
International Search Report and Written Opinion for International Application No. PCT/US2016/047277 dated Oct. 18, 2016 (9 pages).
Eid, M., et al., Bactericidal effect of poly(acrylamide/itaconic acid)-silver nanoparticles synthesized by gamma irradiation against Pseudomonas aeruginosa. Appl Biochem Biotechnol. Sep. 2013;171(2):469-87. DOI: 10.1007/s12010-013-0357-1. Epub Jul. 16, 2013.
Extended European Search Report for Application No. EP16839830.3 dated Feb. 21, 2019 (8 pages).
Guadalupe Rodriguez-Delgado, M., et al., Preparation and characterization of acrylic acid/itaconic acid hydrogel coatings containing silver nanoparticles. Journal of Applied Polymer Science. Nov. 15, 2013;130 (4):2713-2721.
Jovašević, J.S., et al., [Antimikrobna aktivnost hibridnih hidrogelova na bazi poli(vinilpirolidona) koji sadrže srebro] Antimicrobial activity of hybrid hydrogels based on poly(vinylpyrrolidone) containing silver. Hemijska Industrija. 2010;64(3):209-214. Serbian-language article, with English abstract on p. 214.
Jovašević, J.S., et al., Swelling, Mechanical and Antimicrobial Studies of Ag/P (HEMA/IA)/PVP Semi-IPN Hybrid Hydrogels. Acta Physica Polonica A. Aug. 2011;120(2):279-283.
Kačarević-Popović, Z., et al., On the Use of Radiation Technology for Nanoscale Engineering of Silver/Hydrogel Based Nanocomposites for Potential Biomedical Application. The Open Conference Proceedings Journal. 2010;1:200-206.
Kansoh, A.L., et al., Evaluation of the antifungal activities of the novel synthesized chelating co-polymer emulsion attices and their silver complexes. Egyptian Journal of Biotechnology. 2004;17:60-73.
Kansoh, A.L., et al., Studies on the antifungal activities of the novel synthesized chelating co-polymer emulsion attices and their silver complexes. Biotechnol Agron Soc Environ. 2008;12(3):231-238.
Kochkin, D. A., et al., Organotin citraconates and itaconates. Zhurnal Obshchei Khimii. 1973;43(12):2709-12. Russian-language article.
Michelucci, A., et al., Immune-responsive gene 1 protein links metabolism to immunity by catalyzing itaconic acid production. Proc Natl Acad Sci U S A. May 7, 2013;110(19):7820-5. doi: 10.1073/pnas.1218599110. Epub Apr. 22, 2013.
Mićić, M.M, et al., [Kompleksi srebra I kopolimernih hidrogelova na bazi itakonske kiseline] Silver(I)-complexes with an itaconic acid-based hydrogel. Hemijska Industrija. Nov. 3, 2009;63(3)137-142. Serbian-language article, with English abstract on p. 142.
Mićić, M.M., et al., Radiation synthesis, characterization and antimicrobial application of novel copolymeric silver/poly (2-hydroxyethyl methacrylate/itaconic acid) nanocomposite hydrogels. Polymer Bulletin (Heidelberg, Germany). Dec. 2013;70(12):3347-3357.
Qu, S., et al., Metal ion mediated molecularly imprinted polymer for selective capturing antibiotics containing beta-liketone structure. J Chromatogr A. Dec. 24, 2010;1217(52):8205-11. doi: 10.1016/j.chroma.2010.10.097. Epub Oct. 30, 2010.
Rodriguez-Delgado, M.G., et al., Preparation and characterization of acrylic acid/itaconic acid hydrogel coatings containing silver nanoparticles. Journal of Applied Polymer Science. Nov. 15, 2013;130(4):2713-2721.
Rowland, S.P., et al., Enhanced DP Finishing of Cotton with Dimethyloldihydroxyethyleneurea and a Metal Acrylate-Type Monomer. Textile Research Journal. Nov. 1, 1978;48(11):625-632.
Sánchez-Valdez, S., et al., Silver nanoparticle deposition on hydrophilic multilayer film surface and its effect on antimicrobial activity. Journal of Applied Polymer Science. Mar. 5, 2012;123(5):2643-2650.
Tomić, S.LJ., et al., Preparation of Silver(I) Complexes with Itaconic Acid-Based Hydrogels for Biomedical Application. Materials and Manufacturing Processes. Sep. 2009;24(10 & 11):1197-1201.
Weng, Y., et al., A PQAS-containing glass-ionomer cement for improved antibacterial function. Journal of Biomedial Science and Engineering. 2010;3(10):955-962.

* cited by examiner

Poly (silver Itaconate)   Poly (Disilver Itaconate)

Poly (Copper Itaconate)   Poly (Dicopper Itaconate)

Poly (Itaconic acid)

SILVER AND COPPER ITACONATES AND POLY ITACONATES

CROSS-REFERENCE TO RELATED APPLICATIONS

This Application is a National Stage Application of the International Patent Application PCT/US2016/047277 filed on Aug. 17, 2016. Application PCT/US2016/047277 claims the benefit of U.S. Provisional Application 62/208,009 filed on Aug. 21, 2015. The entire contents of these applications are incorporated herein by reference in their entirety.

FIELD OF THE INVENTION

The invention relates to silver and copper itaconates and poly itaconates, as well as methods of making and using the same, for example, as antimicrobial agents and anti scaling agents.

BACKGROUND OF THE INVENTION

Microbial contamination, for example of water, human foodstuffs, and animal feeds as well as medical and industrial equipment, packages, containers, and other objects is a worldwide issue. Intensive research has been ongoing in the area for decades, many antimicrobial agents are known and in use, and new antimicrobial products and methods are constantly being developed.

Metals are one class of antimicrobial agents. For example, copper salts such as copper sulfate and copper chloride are used as disinfectants that are odorless and non-irritating, but provide only briefly-sustained disinfection and are known carcinogens and mutagens. Aqueous copper and silver ions are also disinfectants and used, for example, in water systems. However, aqueous copper and silver ions have only a limited stable ionic life and must be regularly replaced.

There remains a need for improved antimicrobial agents.

SUMMARY OF THE INVENTION

The invention is based, at least in part, on the discovery that certain silver and/or copper itaconates and poly itaconates have antimicrobial properties. The silver and/or copper itaconates and poly itaconates can be advantageously used as antimicrobial agents, for example as coatings on medical items (e.g., bandages, hospital equipment), consumer goods (e.g., clothing, appliances), and industrial equipment (e.g., food service, water treatment), as well as in additives in paints and other surface treatment formulations. The silver and/or copper itaconates and poly itaconates can also be used as disinfectants (e.g., as a wash, spray, or aerosol). The invention can be used for sanitizing, e.g., food processing and pharmaceutical equipment. Additional applications include mitigation of biofilms in cooling systems or recirculating water systems. The polymer can be compounded with other polymers antimicrobial properties of final formulations.

In various aspects and embodiments, the itaconates (the silver and/or copper itaconates and poly itaconates) have greater stability (e.g., useful half-life) and safety (e.g., do not harm humans, pets, livestock) compared to many known antimicrobial agents. Furthermore, the itaconates are more cost effective than many known antimicrobial agents. Formulation of the invention (e.g., polymeric formulations) can provide extended stability and have strong adhesion to surfaces, resulting in coated surfaces remaining disinfected for extended periods of time. Also on drying the formulation (e.g., as a polymeric layer) can be a thin continuous coated film offering better disinfection compared to prior art salts which tend to flake out. Methods of the invention can be based upon single pot synthesis, thus reducing equipment requirements for manufacturing. Also, unlike many prior art formulations, no hazardous and corrosive inorganic acids are necessarily involved in current formulation, mitigating costs associated to storage handling and safety during production.

Accordingly, in various aspects, the invention provides an itaconate having the formula (I):

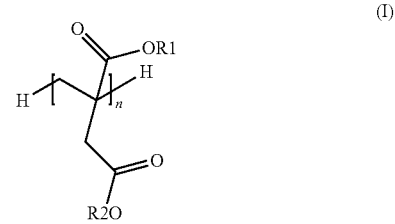

wherein R1 and R2 are each independently selected from H, Ag, or Cu; wherein ratio of Ag and/or Cu to itaconate is at least about 1:1; and wherein n is from 1 to 14.

In various aspects, the invention provides a composition comprising a plurality of itaconate molecules (e.g., formula I, or as otherwise disclosed herein), wherein the plurality of itaconate molecules have an average molecular weight of about 500 to 3,500.

In various aspects, the invention provides a solution comprising a plurality of itaconate molecules formula I, or as otherwise disclosed herein).

In various aspects, the invention includes a method of providing an antimicrobial surface comprising coating an article with an itaconate (e.g., formula I, or as otherwise disclosed herein).

In various aspects, the invention provides an article having an antimicrobial coating comprising an itaconate (e.g., formula I, or as otherwise disclosed herein).

In various aspects, the invention provides an antimicrobial coating comprising a silver and/or copper itaconate homopolymer or heteropolymer (e.g., formula I, or as otherwise disclosed herein).

In various aspects, the invention also provides a method for making an itaconate (e.g., formula I, or as otherwise disclosed herein), comprising: (1) electrolyzing of silver (Ag) or copper (Cu) in an itaconic acid ($C_5H_6O_4$) solution, thereby producing silver or copper itaconate ($C_5H_5AgO_4$ or $C_5H_5CuO_4$) and/or disilver or dicopper itaconate ($C_5H_4Ag_2O_4$ or $C_5H_4Cu_2O_4$); and (2) polymerizing the itaconate produced in (1).

In various embodiments, any of the aspects described herein can be combined with one or more of the features discussed below.

In various embodiments, the plurality of poly itaconate molecules have an average molecular weight of about 500, 1000, 1500, 2000, 2500, 3000, or 3,500 (e.g., as measured by MALDI-TOF MS).

In various embodiments, the ratio of Ag and/or Cu to itaconate can be about 0.1 to 2. In particular embodiments, the ratio of Ag and/or Cu to itaconate can be about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 (e.g., with fractions representing average Ag and/or Cu per monomer over the polymer or sample).

In various embodiments, the composition can also comprise about 30 to 5000 ppm of Ag and/or Cu. In particular embodiments, the composition can also comprise about 30, 40, 50, 60, 70, 80, 90, 100, 200, 250, 300, 400, 500, 600, 700, 750, 800, 900, 1000, 1250, 1500, 1750, 2000, 2250, 2500, 2750, 3000, 3500, 4000, 4500, or 5000 ppm of Ag and/or Cu (e.g., as measured by atomic absorption spectroscopy).

In various embodiments, R1 and R2 are each independently selected from H or Ag (e.g., the itaconate is a silver itaconate). Alternatively, the itaconate can be a copper itaconate or a mixed silver-copper itaconate.

In various embodiments, a plurality of itaconate molecules (e.g., an itaconate as described and claimed herein) are comprised in a solution. In various embodiments, the solution is an aqueous solution. In various embodiments, the solution further comprises an alcohol cosolvent. In various embodiments, the solution does not comprise another polymer. In various embodiments, the solution does not comprise another metal and/or antimicrobial agent in addition to the itaconate.

In various embodiments, the solution further comprises free Ag and/or Cu ions complexed with itaconic acid moieties.

In various embodiments, the antimicrobial coating is in an aqueous solution.

In various embodiments, the itaconates can be formulated with an alcohol (e.g., isopropyl alcohol, ethanol) and can be added to hand sanitizer formulation to further enhance broad spectrum efficacy.

In various embodiments, the antimicrobial coating is coating the surface of an article.

In various embodiments, the itaconates can be used as anti scaling agents.

In various embodiments, the method of making the itaconate is conducted as a one pot synthesis.

In various embodiments, the method of making the itaconate is conducted as an aqueous polymerization or an emulsion polymerization.

Various aspects, embodiments, and features of the invention are presented and described in further detail below. However, the foregoing and following descriptions are illustrative and explanatory only and are not restrictive of the invention, as claimed.

DETAILED DESCRIPTION OF TILE INVENTION

Figure 1:
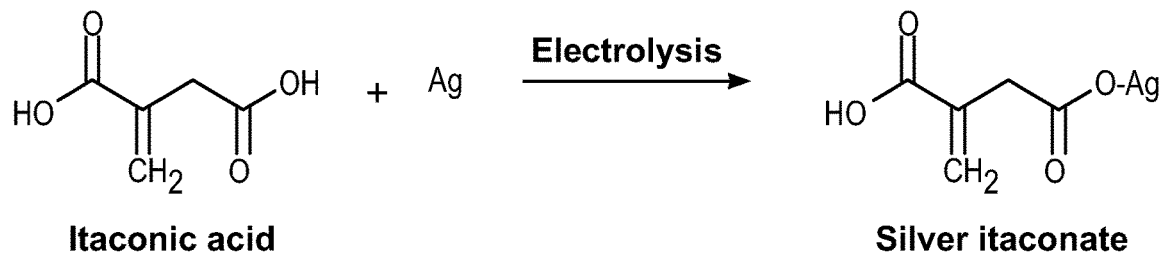
FIG. 1 illustrates example synthetic schemes for silver itaconates.
Figure 1:
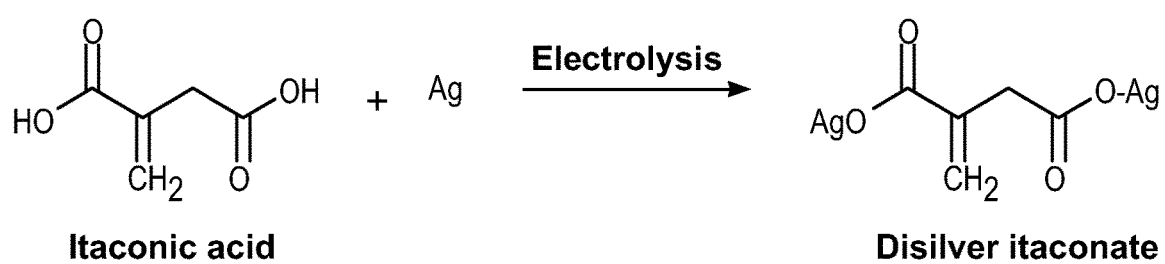

The invention is based, at least in part, on the discovery that certain silver and/or copper itaconates and poly itaconates have antimicrobial properties. The silver and/or copper itaconates and poly itaconates can be advantageously used as antimicrobial agents, for example as coatings on medical items (e.g., bandages, hospital equipment), consumer goods (e.g., clothing, appliances), and industrial equipment (e.g., food service, water treatment), as well as in additives in paints and other surface treatment formulations. The silver and/or copper itaconate and poly itaconates can also be used as disinfectants (e.g., as a wash, spray, or aerosol). The invention can be used for sanitizing, e.g., food processing and pharmaceutical equipment. Additional applications include mitigation of biofilms in cooling systems or recirculating water systems. The polymer can be compounded with other polymers to enhance antimicrobial properties of final formulations.

In various aspects and embodiments, the itaconates (the silver and/or copper itaconates and poly itaconates) have greater stability (e.g., useful half-life) and safety (e.g., do not harm humans, pets, livestock) compared to many known antimicrobial agents. Furthermore, the itaconates are more cost effective than many known antimicrobial agents. Formulation of the invention (e.g., polymeric formulations) can provide extended stability and have strong adhesion to surfaces, resulting in coated surfaces remaining disinfected for extended periods of time. Also on drying the formulation (e.g., as a polymeric layer) can be a thin continuous coated film offering better disinfection compared to prior art salts which tend to flake out. Methods of the invention can be based upon single pot synthesis, thus reducing equipment requirements for manufacturing. Also, unlike many prior art formulations, no hazardous and corrosive inorganic acids are necessarily involved in current formulation, mitigating costs associated to storage handling and safety during production.

Itaconates and Poly Itaconates, Compositions Comprising the Same

Accordingly, in various aspects, the invention provides an itaconate having the formula (I):

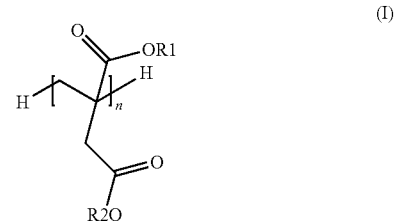

wherein R1 and R2 are each independently selected from H, Ag, or Cu; wherein ratio of Ag and/or Cu to itaconate is at least about 1:1; and wherein n is from 1 to 14.

In various aspects, the invention provides a composition comprising a plurality of poly itaconate molecules, wherein the plurality of poly itaconate molecules have an average molecular weight of about 500 to 3,500. In various embodiments, the plurality of poly itaconate molecules have an average molecular weight of about 500, 1000, 1500, 2000, 2500, 3000, or 3,500 (e.g., as measured by MALDI-TOF MS).

In various embodiments, the ratio of Ag and/or Cu to itaconate can be about 0.1 to 2. In particular embodiments, the ratio of Ag and/or Cu to itaconate can be about 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, or 2.0 (e.g., with fractions representing average Ag and/or Cu per monomer over the polymer or sample).

In various embodiments, the composition can also comprise about 30 to 5000 ppm of Ag and/or Cu. In particular embodiments, the composition can also comprise about 30, 40, 50, 60, 70, 80, 90, 100, 200, 250, 300, 400, 500, 600, 700, 750, 800, 900, 1000, 1250, 1500, 1750, 2000, 2250, 2500, 2750, 3000, 3500, 4000, 4500, or 5000 ppm of Ag and/or Cu (e.g., as measured by atomic absorption spectroscopy).

In various embodiments, R1 and R2 are each independently selected from H or Ag (e.g., the itaconate is a silver itaconate). Alternatively, the itaconate can be a copper itaconate or a mixed silver-copper poly itaconate.

In various embodiments, a plurality of itaconate molecules (e.g., an itaconate as described and claimed herein) are comprised in a solution. In various embodiments, the solution is an aqueous solution. In various embodiments, the solution further comprises an alcohol cosolvent. An alcohol cosolvent can be ethanol or isopropyl alcohol. In some embodiments, an alcohol can be added to alter and/or control the rate of evaporation (e.g., when used as a disinfectant or coating). An alcohol cosolvent can also enhance antimicrobial activity of the composition due to the antimicrobial effect of the alcohol itself. In various embodiments, the composition can include an additional antimicrobial agent. In various embodiments, the solution does not comprise another polymer (e.g., to alter and/or improve coating properties). In various embodiments, the solution further comprises free Ag and/or Cu ions complexed with itaconic acid moieties.

In various embodiments, the itacontaes can be added to other existing products like paints, hand sanitizers, soaps, food wax, and the like, to impart or enhance antimicrobial properties of the products. In various embodiments, the itacontaes can be formulated with an alcohol (e.g., isopropyl alcohol, ethanol) and can be added to hand sanitizer formulation to further enhance broad spectrum efficacy.

In various embodiments, the itaconates can be used as anti scaling agents.

Without wishing to be bound by any particular theory, it is believed that the itaconates can act as antiscaling agents based on affinity of itaconic acid to Mg/Ca ions.

Alternatively, in various embodiments, the solution does not comprise another metal and/or antimicrobial agent in addition to the itaconate.

Methods of Making Itaconates and Poly Itaconates

In various aspects, the invention also provides a method for making an itaconate (e.g., formula I, or as otherwise disclosed herein), comprising: (1) electrolyzing of silver (Ag) or copper (Cu) in an itaconic acid ($C_5H_6O_4$) solution, thereby producing silver or copper itaconate ($C_5H_5AgO_4$ or $C_5H_5CuO_4$) and/or disilver or dicopper itaconate ($C_5H_4Ag_2O_4$ or $C_5H_4Cu_2O_4$), and (2) polymerizing the itaconate produced in (1). Such synthetic schemes are discussed in detail in Example 1 below, as illustrated in connection with FIGS. 1-5.

In various embodiments, the method of making the itaconate is conducted as a one pot synthesis. A one pot synthesis can provide practical advantages including reducing synthesis time and/or cost. For example, the one pot synthesis can help avoiding separation and purification of intermediate chemical compounds, and can otherwise time and resources while increasing chemical yield.

In various embodiments, the method of making the itaconate is conducted as an aqueous polymerization or an emulsion polymerization. In various embodiments, aqueous polymerization is the cheapest method and has the added advantage of not requiring solvent recovery. However, in other embodiments, emulsion polymerization can result in higher molecular weight polymer and lower polydispersity.

Variations and alternatives will be understood by those skilled in the art and in view of the instant disclosure. For example, alternative synthetic methodologies can include electrolytic introduction of the metal (e.g., Ag and/or Cu) ions.

Antimicrobial Uses, Coatings, Articles

In various aspects, the invention can be used as an antimicrobial agent, for example as a disinfectant (e.g., the itaconate in solution, applied as a wash, spray, aerosol, or the like). Although application of the itaconate solution can result in an antimicrobial coating (discussed below), embodiments of the invention specifically contemplate the use of the itaconates as antimicrobial agents independent of any coating properties.

In various aspects, the invention also includes a method of providing an antimicrobial surface comprising coating an article with an itaconate. For example, the itaconate can be supplied as a solution (e.g., in a solvent) and dipped or sprayed onto the surface of the article (e.g., as an aerosol). As the solvent evaporates (e.g., by air drying or in an oven) the process can leave a film of polymer/metal ions on the surface of the article. One skilled in the art can adapt known disinfection and coating methodologies to the instant invention.

Furthermore, in various aspects, the invention provides an article having an antimicrobial coating comprising an itaconate. For example, the article can be a medical item, consumer goods, industrial equipment, or another thing that can be improved by incorporation of an antimicrobial treatment or coating.

The invention has many application in the medical field (e.g., disinfecting and/or coating hospital and surgical equipment, wound dressings, and the like), in food service (e.g., preparation surface disinfection and equipment disinfection, water supply, and the like), in preventing biofilm formation (e.g., in pipelines, keeping flowing waterlines free of microbial contamination, cooling tower lines, underground drilling lines, chemical and nuclear plants, and the like), in agriculture and horticulture (e.g., disinfectant spray formulation for green houses or aerial spraying), as a general additive to plastics or other materials, to impart antimicrobial properties, in personal care products (e.g., diapers, band aids, sanitary pads, disinfecting wipes, and the like), in warehouse, storage, commercial vehicle, and building disinfection, as a general treatment to yarns or fibers (e.g., to make antimicrobial clothing, woven materials, bandages, wound dressings, and the like), and in electrospinning the polymer in native or blended for to create antimicrobial mats. Furthermore, materials according to the invention can be used as plastic additives, to impart antimicrobial properties in plastics.

As already discussed, in various embodiments, the invention has numerous application in hospitals, the food and beverage industry, in pharmaceutical, and in manufacturing. In one embodiment, a coating according to the invention is formulated or used for, an aqueous and/or alcohol based spray for hard surface disinfection. In one embodiment, a coating according to the invention is formulated, or used, for and aqueous and/or alcohol based aerosol for operation theater, manufacturing plant, or warehouse disinfection. In one embodiment, a coating according to the invention is formulated, or used, for sanitizing tanks, pipelines, or other food & beverage or pharmaceutical manufacturing equipment internals. In one embodiment, a coating according to the invention is formulated, or used, for spraying fruits and vegetables to mitigate infection. In one embodiment, a coating according to the invention is formulated, or used, as an additive to wax used to coat fruits & vegetables (e.g., apples) to extend shelf life. In one embodiment, a coating according to the invention is formulated, or used, for coating crates and packaging material.

As already discussed, in various embodiments, the invention has numerous application in agriculture, horticulture, poultry and dairy. In one embodiment, a coating according to the invention is formulated or used in spray or aerosolized form in green houses and aerial spraying for farm lands. In one embodiment, a coating according to the invention is formulated or used for soil preparation for green houses. In one embodiment, a coating according to the invention is formulated or used for sanitization of poultry and dairy farms in aerosol and/or spray form. In one embodiment, a coating according to the invention is formulated or used for disinfecting dairy animal (e.g., cow) udders in lotion or spray form.

EXAMPLES

Example 1: Synthetic Schemes for the Preparation of Itaconates

This example describes synthetic schemes for preparing silver and/or copper itaconate by electrolysis of silver or copper in an itaconic acid solution. This example further describes a method for polymerizing the silver and/or copper itaconate into poly itaconates.

The synthetic scheme shown in FIG. 1 illustrates the electrolysis of silver and itaconic acid ($C_5H_6O_4$) resulting in silver itaconate ($C_5H_5AgO_4$) or disilver itaconate ($C_5H_4Ag_2O_4$). Without wishing to be bound by any particular theory, in some embodiments, the itaconic acid may facilitate the reaction by stabilizing $Ag^+$ ions generated during electrolysis.

Figure 2:
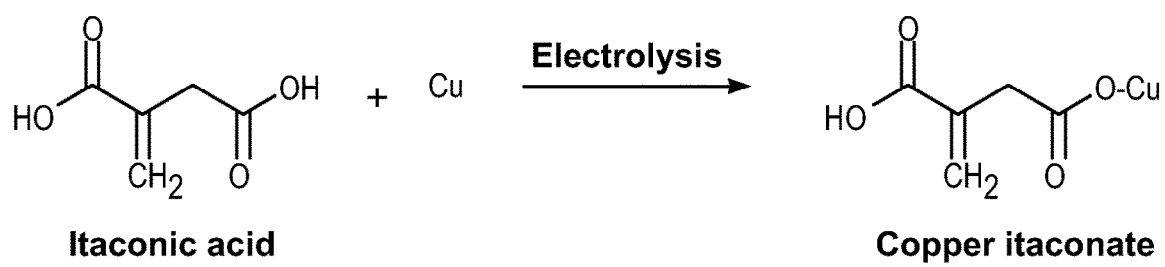
FIG. 2 illustrates example synthetic schemes for copper itaconates.
Figure 2:
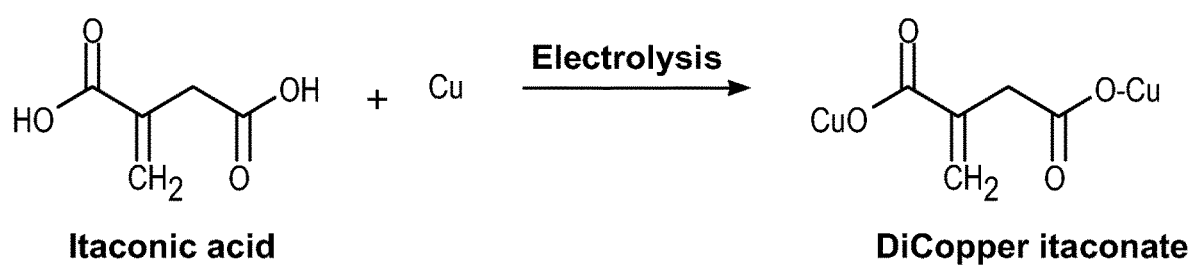

Similar to FIG. 1, the synthetic scheme shown in FIG. 2 illustrates the electrolysis of copper and itaconic acid resulting in copper itaconate or dicopper itaconate.

Figure 3:
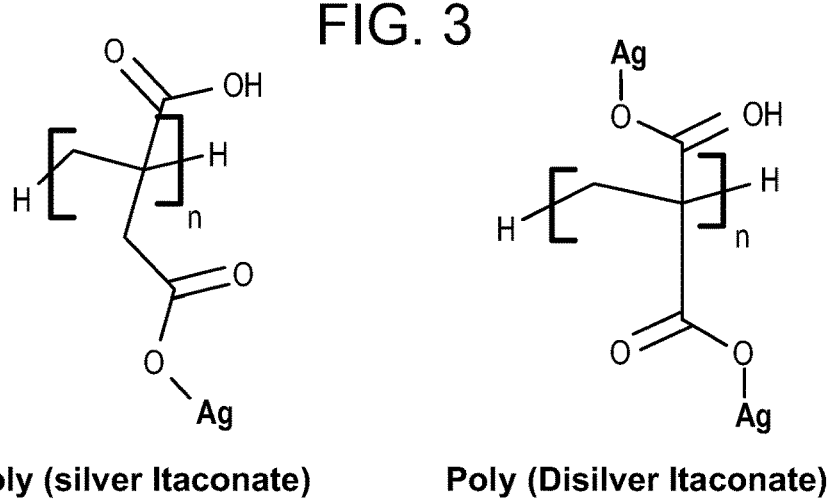
FIG. 3 illustrates example structures for silver poly itaconates.

FIG. 3 illustrates the resulting poly (silver itaconate) or poly (disilver itaconate). In various embodiments, the invention also includes polymers comprising both silver itaconate and disilver itaconate monomers.

Figure 4:
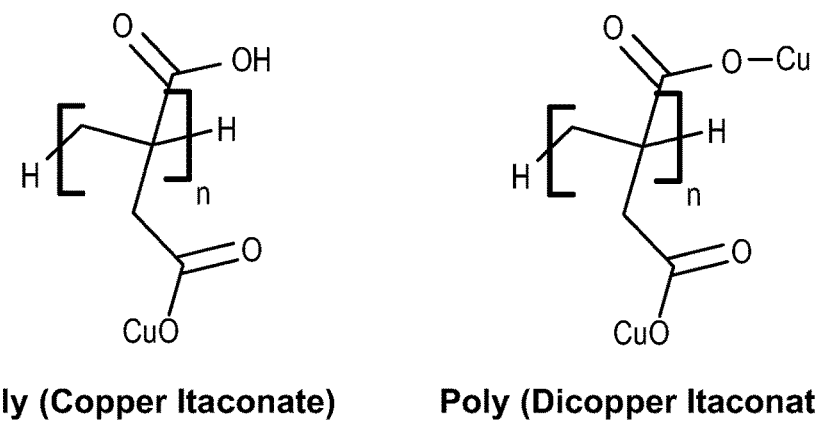
FIG. 4 illustrates example structures for copper poly itaconates.

FIG. 4 illustrates the resulting poly (copper itaconate) or poly (dicopper itaconate). In various embodiments, the invention also includes polymers comprising both copper itaconate and dicopper itaconate monomers.

Figure 5:
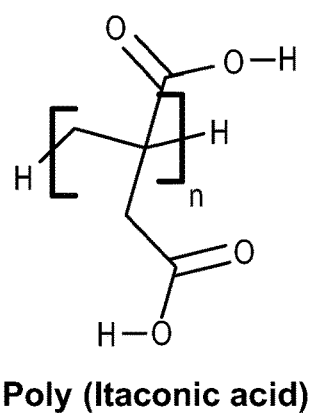
FIG. 5 illustrates an example structure for poly itaconic acid.

Similarly, FIG. 5 illustrates the resulting poly (itaconic acid). In various embodiments, the invention includes polymers comprising mixtures of silver itaconate, di silver itaconate, copper itaconate, and di copper itaconate, and/or itaconic acid.

Variations on these synthetic schemes, as well as suitable alternatives, will be understood to those skilled in the art in view of the instant disclosure. Illustrative examples showing implementations of these synthetic schemes are discussed in Examples 2-4 below.

Example 2: Preparation of Silver Itaconates

This example describes the preparation of different silver itaconate solutions.

To prepare the positive control solution (Sample I), three solutions were prepared and labeled A, B, or C. Solution A contained 0.145 M phosphoric acid. Solution B contained 0.85 M nitric acid and 1.47 M silver nitrate. Solution C contained 4.7 M of tartaric acid. To prepare the stock solution, 16.2 mL of Solution A, 22.7 mL of Solution 13, and 6.8 mL of Solution C was mixed together and the volume was made up to 40 mL. This stock was diluted in 30% hydrogen peroxide and water to form the final solution as shown in Table 1.

TABLE 1

| Positive Control Solution (Sample I) | |
|---|---|
| | Sample I |
| Hydrogen Peroxide (30%) (mL) | 946.5 |
| Hydrogen Peroxide concentration | 29.97% |
| RODI Volume (mL) | 43.50 |
| Inorganic acid stabilized silver (mL) | 1 |
| Silver concentration in final solution (ppm) | 877 |

A stock of silver itaconate was prepared by electrolysis of a silver electrode in 0.25 M itaconic acid solution using a DC source set at 23.9 V for 30 minutes at ambient temperature. The concentration of silver obtained by this process was 262 ppm. Next, this stock silver itaconate was blended with 30% (w/w) hydrogen peroxide in two dilution ratios to result in silver itaconate Samples IV and V as shown in Table 2.

TABLE 2

| Dilution ratios for the Silver Itaconate solutions (Sample IV and V) | | |
|---|---|---|
| | Sample IV | Sample V |
| Hydrogen Peroxide (30%) | 50 | 500 |
| Electrolysis stock | 450 | 500 |
| Hydrogen Peroxide concentration in final solution (w/w) | 3% | 15% |
| Silver concentration in final solution (ppm) | 236 | 138 |

A stock solution of silver stabilized in itaconic acid was prepared by first dissolving 6.8 g of itaconic acid in 200 mL of reverse osmosis/deionized water (RO/DI). Next, 5.6 g of silver nitrate was added to this solution. The salts were mixed at ambient temperature until fully dissolved. Finally, this stock solution of silver stabilized in itaconic acid was blended with 30% (w/w) hydrogen peroxide or RO/DI in dilution ratios to result in Samples II and III as shown in Table 3.

TABLE 3

| Dilution ratios for the Silver stabilized in Itaconic acid solutions | | |
|---|---|---|
| | Sample II | Sample III |
| Hydrogen Peroxide (30%) (mL) | 946.5 | 0 |
| Hydrogen Peroxide concentration | 28.40% | 0.00% |
| RO/DI Volume (mL) | 0.00% | 946.60 |
| Itaconic stabilized silver | 53.5 | 53.5 |
| Silver concentration in final solution (ppm) | 727 | 743 |

Example 3: Antimicrobial Evaluation of Silver Itaconates

This example describes the antimicrobial activity of the silver itaconate solutions from Example 2. Specifically, the Samples I-V from Example 2 were tested for efficacy against *Staphylococcus aureus* (ATCC#6538) and *Pseudomonas aeruginosa* (ATCC#15442) using the standard practices based on Association of Analytical Chemists (AOAC) disinfection test protocol dilution method for hard surfaces. For current work, a truncated study was performed with 20 carriers versus 60 recommended in the standard method. Efficacy of the disinfectant samples was tested at 25° C. for a contact time of ten minutes. Killing of the test organism on a total of 20 carriers was monitored. The results are summarized in Table 4, which shows that all five silver itaconate solutions (Samples I-V) effectively killed the test organisms and would be useful as antimicrobial agents.

TABLE 4

Efficacy of Silver Itaconate Solutions against *S. aureus* and *P. aeruginosa*

| Test organism | Sample I | Sample II | Sample III | Sample IV | Sample V |
|---|---|---|---|---|---|
| *Pseudomonas aeruginosa* | Effective on 20/20 | Effective on 20/20 | Effective on 16/20 | Effective on 20/20 | Effective on 20/20 |
| *Staphylococcus aureus* | Effective on 20/20 | Effective on 20/20 | Effective on 17/20 | Effective on 20/20 | Effective on 20/20 |

Example 4—Preparation and Physical Characterization of Itaconates

This example describes the preparation any physical characterization of different itaconate solutions.

Figure 6:
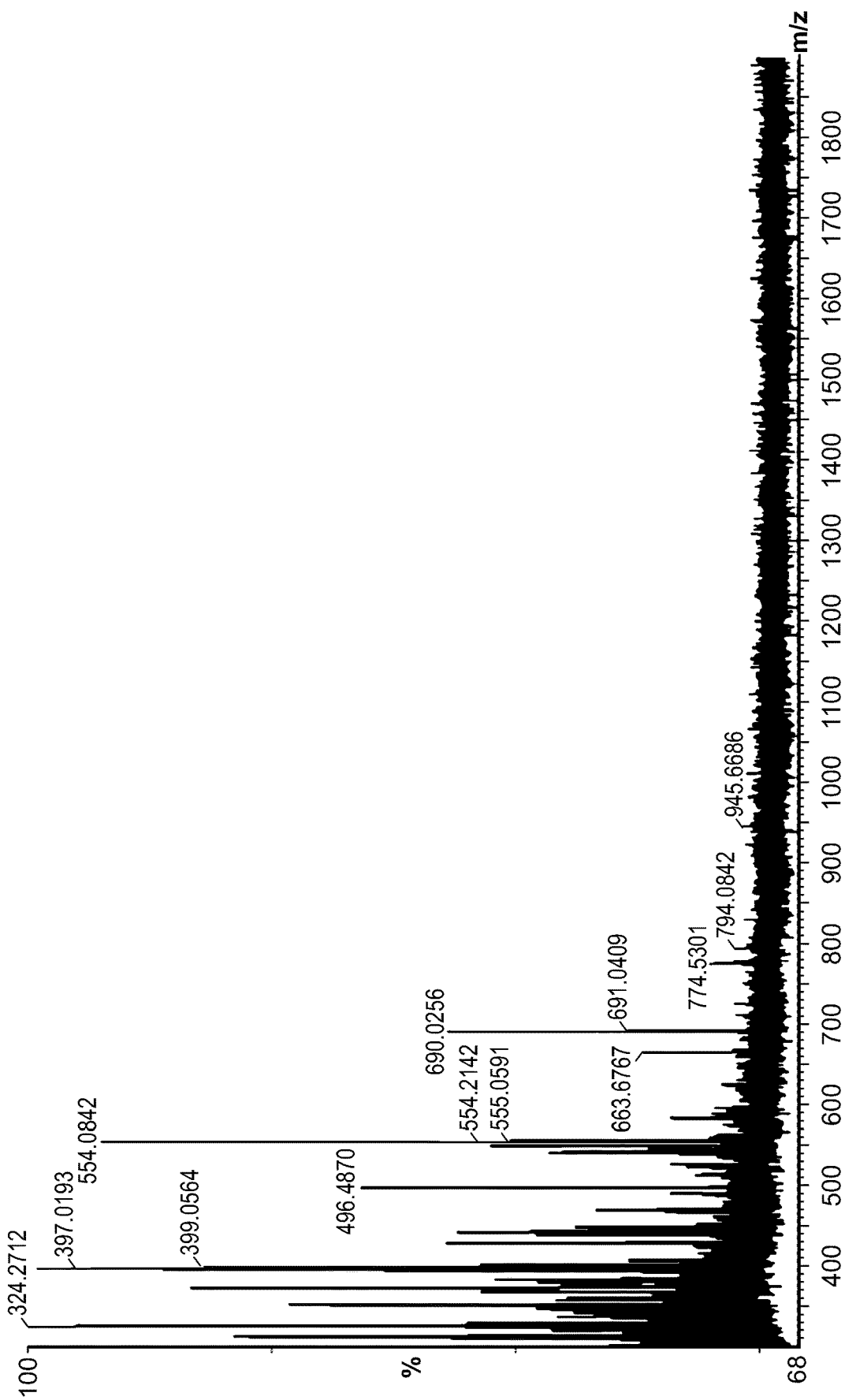
FIG. 6-9 illustrates MALDI-TOF spectra for example poly itaconates.

Sample VI:

A control solution (Sample VI) for aqueous itaconic acid polymerization (sodium poly itaconate) was prepared using the following procedure: First, 240 of RO/DI was heated to 85° C. and 230 g of itaconic acid was added. After the itaconic acid was completely dissolved, 142 g of 50% NaOH was gradually added over 1 hr. The reaction was allowed to continue for an additional 1 hr. Next, 75 mL of 30% hydrogen peroxide was gradually added over 1 hr. The reactants continued to mix at 85° C. for an additional 3 hrs and 20 minutes. The aqueous polymer obtained had an appearance of viscous yellow gel. Molecular weight for the control sample was analyzed by MALDI-TOF spectra as shown in FIG. 6. The mass to charge ratio for the sodium poly itaconate solution included peaks up to 945 m/z.

All samples were deposited on the MALDI target plates by drop casting and annealing in vacuum over at 30° C. MALDI-TOF MS data were acquired using a WATERS Micromass spectrometer. The instrument is equipped with a 337 nm pulsed nitrogen laser. TOF data from 20-50 individual laser pulses exposure were recorded and averaged on a transient digitizer, after which averaged spectra were automatically converted into mass by MassLynx data processing software.

Figure 7:
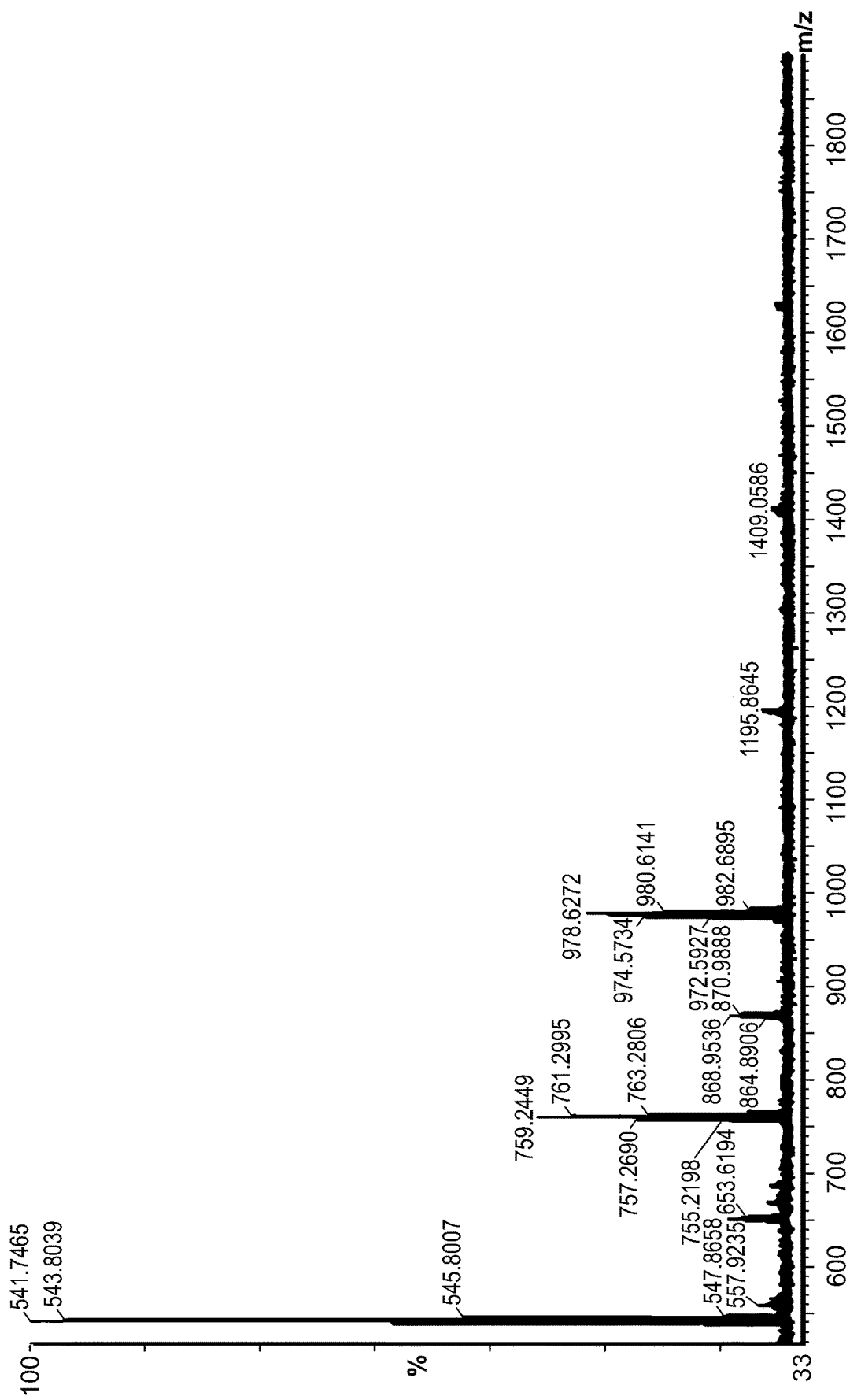

Sample VII:

A solution of silver poly itaconate (Sample VII) was prepared using the following procedure: First, 240 mL of RO/DI was heated to 85° C. and 230 g of itaconic acid was added. After the itaconic acid was completely dissolved, electrolysis of silver electrode in this solution using a DC source set at 23.9 V was initiated. Electrolysis was carried out for 60 minutes at 85° C. After electrolysis was completed, 75 mL of 30% hydrogen peroxide was added over 1 hr in 3 bolus additions of 25 mL each. Post addition, the reaction was continued for an additional 1 hr at 85° C. The aqueous polymer obtained had an appearance of viscous colorless gel. The silver concentration in the final sample was 2840 mg/L based on atomic absorption spectroscopy. Molecular weight for the silver poly itaconate sample was analyzed by MALDI-TOF spectra as shown in FIG. 7. The mass to charge ratio for the silver poly itaconate solution included peaks up to 1409 m/z.

Figure 8:
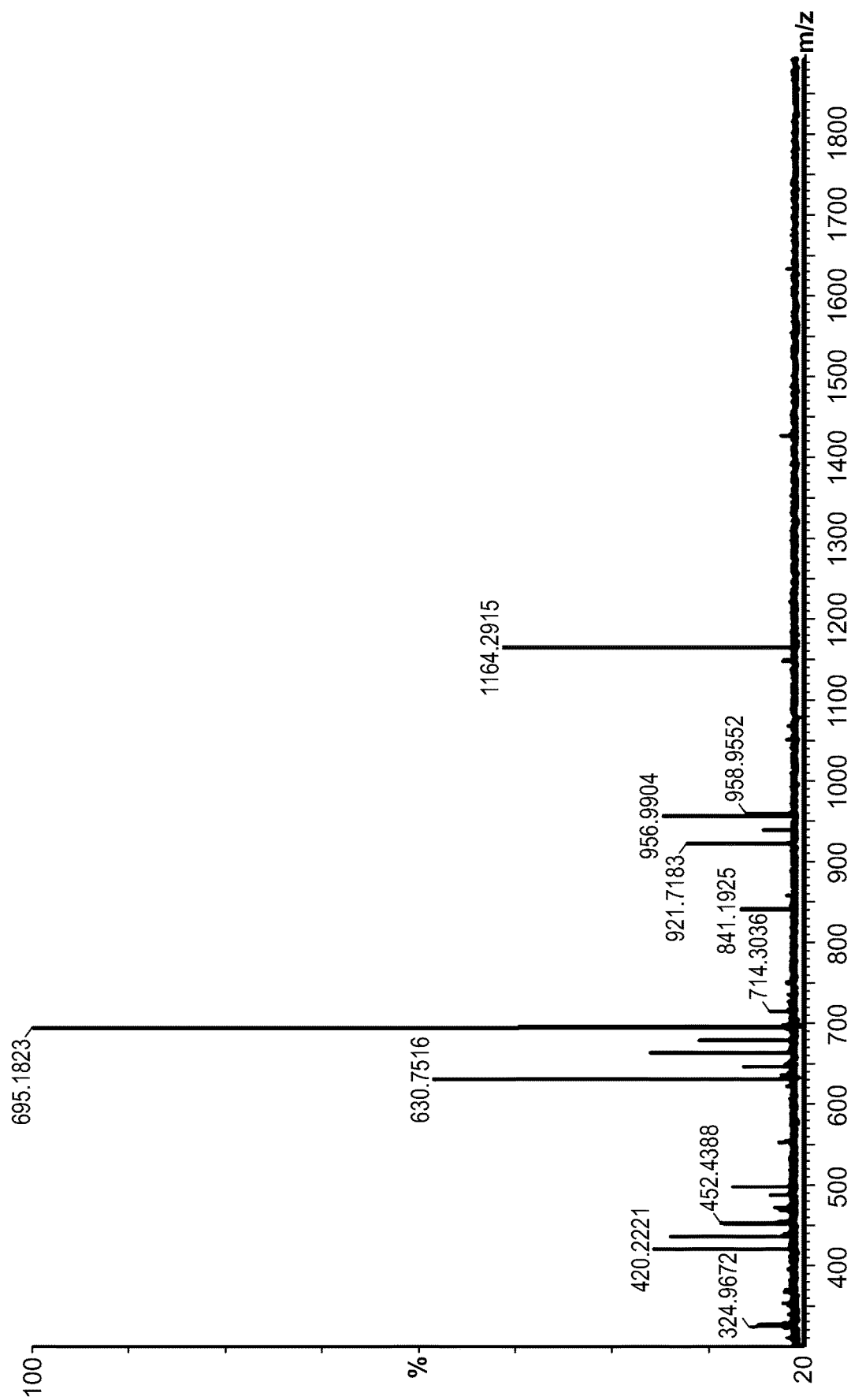

Sample VIII:

A solution of copper poly itaconate (Sample VIII) was prepared using the following procedure: First, 240 mL of RO/DI was heated to 85° C. and 230 g of itaconic acid was added. After the itaconic acid was completely dissolved, electrolysis of copper electrode in this solution using a DC source set at 23.9 V was initiated. Electrolysis was carried out for 60 minutes at 85° C. After electrolysis was completed, 50 mL of 30% hydrogen peroxide was added over 40 min in 2 bolus additions of 25 mL each. Post addition, the reaction was continued for an additional 1 hr at 85° C. The aqueous polymer obtained had an appearance of viscous green gel. The copper concentration in the final sample was 1622 mg/L based on atomic absorption spectroscopy. Molecular weight for the copper poly itaconate sample was analyzed by MALDI-TOF spectra as shown in FIG. 8. The mass to charge ratio for the copper poly itaconate solution included peaks up to 1164 m/z.

Figure 9:
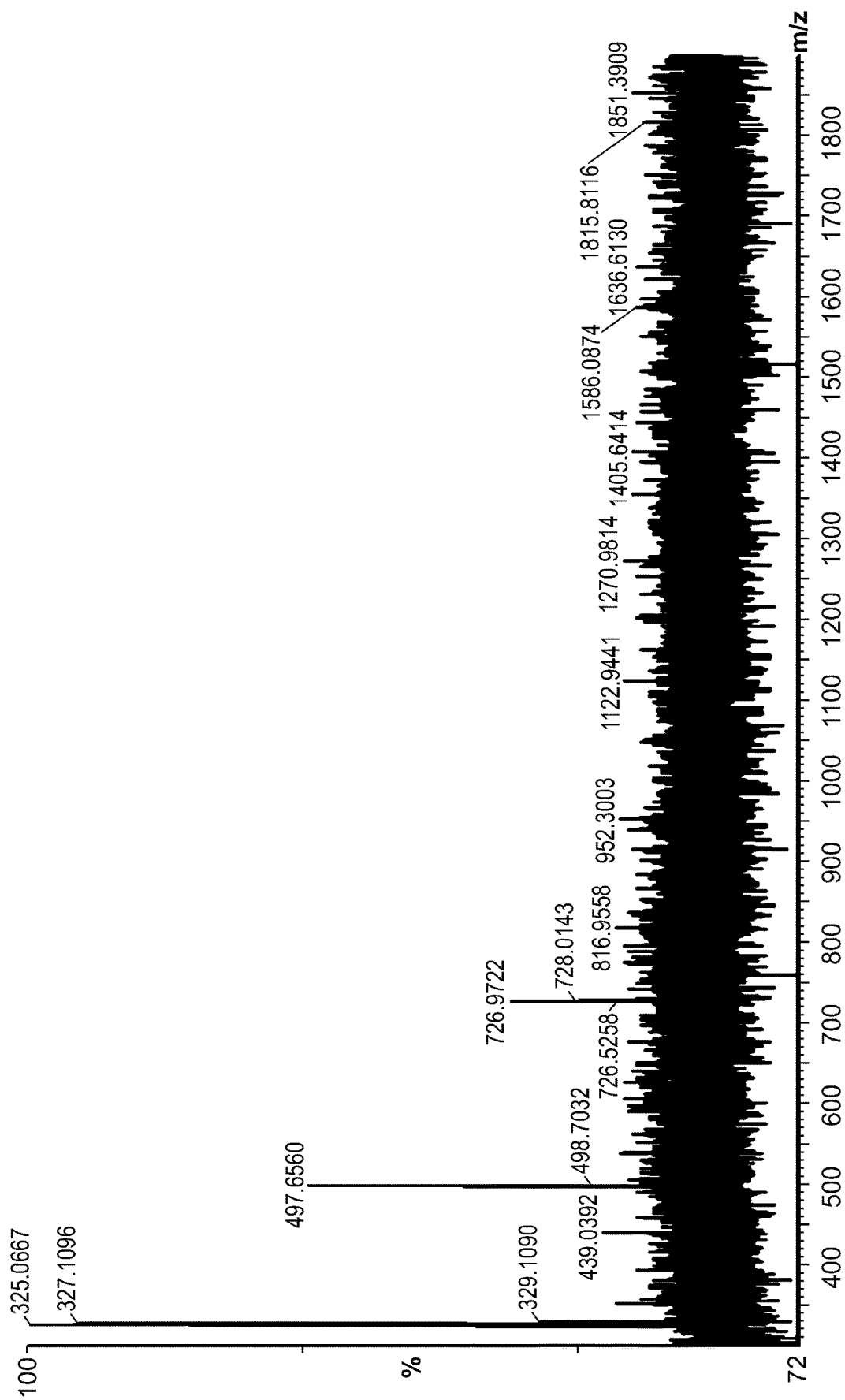

Sample IX:

Finally, a solution of poly itaconate using silver oxide (silver oxide solution, Sample IX) was prepared using the following procedure: First, 240 mL of RO/DI was heated to 85° C. and 230 g of itaconic acid was added. After the itaconic acid was completely dissolved, 0.503 g of silver oxide was added. After the silver oxide was well dispersed, 75 mL of 30% hydrogen peroxide was added over 1 hr in 3 bolus additions of 25 mL each. Post addition, the reaction continued for an additional 1 hr at 85° C. The aqueous polymer obtained had an appearance of viscous colorless gel. The silver concentration in the final sample was 1520 mg/L based on atomic absorption spectroscopy. Molecular weight for the silver oxide sample was analyzed by MALDI-TOF Spectra as shown in FIG. 9. The mass to charge ratio for the silver oxide solution included peaks up to 1851 m/z.

Example 5: Antimicrobial Evaluation of Poly Itaconates

This example describes the antimicrobial activity of the silver itaconate solutions from Example 4. Specifically, Samples VI-IX (sodium poly itaconate, silver poly itaconate, copper poly itaconate, and poly itaconate using silver oxide) were tested for Minimal inhibitory Concentration (MIC) against *Pseudomonas aeruginosa* (ATCC #9027) and Methicillin-resistant *Staphylococcus aureus* (ATCC#43300) using the standard CLSI/NCCLS method. MIC is defined as the lowest concentration of an antimicrobial compound that still prevents growth of the organism it is tested against. The MIC results are shown in Table 5.

TABLE 5

Efficacy of Poly Itaconate Solutions Against
*P. aeruginosa* and *S. aureus*

| Formulation | MIC test results | | Comments |
| --- | --- | --- | --- |
| | *P. aeruginosa* | *S. aureus* | |
| Sample VI, Sodium Itaconate control diluted 20x | 0% | 0% | No efficacy |
| Sample VII, Silver Itaconate diluted 20x | 6.25% | 6.25% | MIC of 20x diluted samples |
| Sample VIII, Copper Itaconate diluted 20x | 6.25% | 6.25% | MIC of 20x diluted samples |
| Sample IX, Silver Oxide diluted 20x | 6.25% | 3.125% | MIC of 20x diluted samples |

As shown in Table 5, sodium poly itaconate (control) had no measured efficacy against the test organisms whereas the 20× diluted silver and copper poly itaconate solutions had. MIC values of 6.25% against *Pseudomonas aeruginosa* and Methicillin-resistant *Staphylococcus aureus*. Furthermore, the 20× diluted silver oxide solution had. MIC values of 6.25% and 3.125% against *Pseudomonas aeruginosa* and Methicillin-resistant *Staphylococcus aureus*, respectively. Thus, these example silver and copper itaconate solutions (Samples VII-IX) effectively killed the test organisms and would be useful as antimicrobial agents.

The specification is most thoroughly understood in light of the teachings of the references cited within the specification. The embodiments within the specification provide an illustration of embodiments of the invention and should not be construed to limit the scope of the invention. The skilled artisan readily recognizes that many other embodiments are encompassed by the invention. Those skilled in the art will recognize, or be able to ascertain using no more than routine experimentation, many equivalents to the specific embodiments of the invention described herein. Such equivalents are intended to be encompassed by the following claims.

The invention claimed is:
1. An itaconate having the formula:

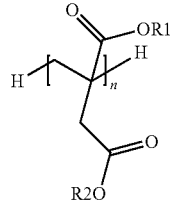

wherein R1 and R2 are each independently selected from H or Ag,
wherein a ratio of Ag to itaconate is at least about 1:1; and
wherein n is from 2 to 14.

2. A composition comprising a plurality of itaconate molecules of claim 1, wherein the plurality of itaconate molecules has an average molecular weight of about 500 to 3,500.

3. The composition of claim 2, wherein the ratio of Ag to itaconate is about 1 to 2.

4. The composition of claim 2, comprising about 30 to 5000 ppm of Ag.

5. A solution comprising a plurality of itaconate molecules of claim 1.

6. The solution of claim 5, wherein the solution is an aqueous solution.

7. The solution of claim 6, further comprising an alcohol cosolvent.

8. The solution of claim 5, wherein the solution does not comprise another polymer.

9. The solution of claim 5, further comprising free Ag ions complexed with itaconic acid moieties.

10. A method of providing an antimicrobial surface comprising coating an article with the itaconate of claim 1.

11. An article having an antimicrobial coating comprising silver the itaconate of claim 1.

12. An antimicrobial coating comprising the itaconate of claim 1.

13. The antimicrobial coating of claim 12, in an aqueous solution.

14. A method for making the itaconate of claim 1, comprising:
(1) electrolyzing silver (Ag) in an itaconic acid ($C_5H_6O_4$) solution, thereby producing silver ($C_5H_5AgO_4$) and/or disilver itaconate ($C_5H_4Ag_2O_4$); and (2) polymerizing the silver and/or disilver itaconate produced in (1).

15. The method of claim 14, conducted as a one pot synthesis.

16. The method of claim 14, conducted as an aqueous polymerization or an emulsion polymerization.

* * * * *